(12) United States Patent
Bullough et al.

(10) Patent No.: US 10,574,804 B2
(45) Date of Patent: *Feb. 25, 2020

(54) AUTOMATIC VOLUME CONTROL OF A VOICE SIGNAL PROVIDED TO A CAPTIONING COMMUNICATION SERVICE

(71) Applicant: Sorenson IP Holdings, LLC, Salt Lake City, UT (US)

(72) Inventors: Jeffrey C. Bullough, South Jordan, UT (US); Shane A. Roylance, Farmington, UT (US); Brian Chevrier, Highland, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/194,332

(22) Filed: Jun. 27, 2016

(65) Prior Publication Data

US 2017/0078463 A1 Mar. 16, 2017

Related U.S. Application Data

(63) Continuation of application No. 14/933,893, filed on Nov. 5, 2015, now Pat. No. 9,380,150.

(60) Provisional application No. 62/219,654, filed on Sep. 16, 2015.

(51) Int. Cl.
*H04M 1/247* (2006.01)
*H04M 1/725* (2006.01)
*H04M 9/08* (2006.01)
*H04W 4/16* (2009.01)
*H04M 1/60* (2006.01)
*H04M 3/00* (2006.01)
*H04M 3/42* (2006.01)

(52) U.S. Cl.
CPC .......... *H04M 1/2475* (2013.01); *H04M 1/60* (2013.01); *H04M 1/72591* (2013.01); *H04M 3/002* (2013.01); *H04M 9/082* (2013.01); *H04W 4/16* (2013.01); *H04M 3/42391* (2013.01); *H04M 2207/30* (2013.01)

(58) Field of Classification Search
CPC ... H04M 2203/253; H04M 2203/4536; H04W 4/18; H04W 4/20
USPC .............. 381/66, 93, 94.1, 94.3; 379/406.02, 379/406.07, 406.16, 88.13, 395
See application file for complete search history.

(56) References Cited

U.S. PATENT DOCUMENTS 4,777,469 A 10/1988 Engelke et al.
4,959,847 A 9/1990 Engelke et al.
5,081,673 A 6/1992 Engelke et al.
(Continued)

*Primary Examiner* — Alexander Krzystan
(74) *Attorney, Agent, or Firm* — Maschoff Brennan

(57) ABSTRACT

Apparatuses and methods are disclosed for automatic volume control of an audio stream reproduced by a captioning communication service for use by a call assistant in generating a text transcription of a communication session between a hearing-impaired user and a far-end user. The automatic volume control automatically adjusts a volume of the audio stream reproduced by the captioning communication service responsive to a volume control command identifying which of the far-end voice signal and the near-end voice signal is active at a given time. The system further includes an echo modifier configured to add distortion to an echo portion of the far-end voice signal when generating the audio stream.

20 Claims, 11 Drawing Sheets

(56) References Cited

U.S. PATENT DOCUMENTS

| | | | |
|---|---|---|---|
| 5,315,585 A * | 5/1994 | Iizuka | H04B 3/23 370/289 |
| 5,325,417 A | 6/1994 | Engelke et al. | |
| 5,327,479 A | 7/1994 | Engelke et al. | |
| 5,351,288 A | 9/1994 | Engelke et al. | |
| 5,432,837 A | 7/1995 | Engelke et al. | |
| D364,865 S | 12/1995 | Engelke et al. | |
| 5,581,593 A | 12/1996 | Engelke et al. | |
| 5,604,786 A | 2/1997 | Engelke et al. | |
| 5,687,222 A | 11/1997 | McLaughlin et al. | |
| 5,724,405 A | 3/1998 | Engelke et al. | |
| 5,809,425 A | 9/1998 | Colwell et al. | |
| 5,815,496 A | 9/1998 | Flanagan et al. | |
| 5,909,482 A | 6/1999 | Engelke | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,496,798 B1 | 12/2002 | Huang et al. | |
| 6,504,910 B1 | 1/2003 | Engelke et al. | |
| 6,510,206 B2 | 1/2003 | Engelke et al. | |
| 6,516,050 B1 * | 2/2003 | Tasaki | H04B 3/234 370/286 |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 7,003,082 B2 | 2/2006 | Engelke et al. | |
| 7,006,604 B2 | 2/2006 | Engelke | |
| 7,164,753 B2 | 1/2007 | Engelke et al. | |
| 7,319,740 B2 | 1/2008 | Engelke et al. | |
| 7,555,104 B2 | 6/2009 | Engelke | |
| 7,660,398 B2 | 2/2010 | Engelke et al. | |
| 7,881,441 B2 | 2/2011 | Engelke et al. | |
| 8,213,578 B2 | 7/2012 | Engleke et al. | |
| 8,379,801 B2 | 2/2013 | Romriell et al. | |
| 8,416,925 B2 | 4/2013 | Engelke et al. | |
| 8,908,838 B2 | 12/2014 | Engelke et al. | |
| 8,917,821 B2 * | 12/2014 | Engelke | G10L 15/265 379/52 |
| 8,917,822 B2 | 12/2014 | Engelke et al. | |
| 9,350,857 B1 | 5/2016 | Engelke et al. | |
| 9,380,150 B1 * | 6/2016 | Bullough | H04M 1/72591 |
| 2003/0007633 A1 * | 1/2003 | Tucker | H04B 3/234 379/406.08 |
| 2008/0187108 A1 | 8/2008 | Engelke et al. | |
| 2009/0089042 A1 | 4/2009 | Wald et al. | |
| 2011/0170672 A1 | 7/2011 | Engelke et al. | |
| 2012/0250837 A1 | 10/2012 | Engleke et al. | |
| 2013/0201272 A1 * | 8/2013 | Enbom | H04N 7/15 348/14.01 |
| 2013/0317818 A1 * | 11/2013 | Bigham | G10L 15/265 704/235 |
| 2014/0229171 A1 * | 8/2014 | Atti | G10L 21/0388 704/225 |

* cited by examiner

AUTOMATIC VOLUME CONTROL OF A VOICE SIGNAL PROVIDED TO A CAPTIONING COMMUNICATION SERVICE

CROSS-REFERENCE TO RELATED APPLICATIONS

This application claims the benefit of U.S. patent application Ser. No. 14/933,893 filed Nov. 5, 2015, which claims the benefit of U.S. Provisional Patent Application Ser. No. 62/219,654, filed Sep. 16, 2015, the disclosures of which are hereby incorporated herein in their entireties by this reference.

FIELD

The application relates generally to telecommunications and more particularly to communicating with a captioning communication service for assisting hearing-impaired users in communicating with others. In addition, the disclosure relates to automatic volume control for the far-end signal received by the captioning communication service during a captioning communication session.

BACKGROUND

Hearing-impaired individuals may benefit from communication systems and devices configured to provide assistance in order to communicate with other individuals over a communication network. For example, captioning communication services have been established to provide assistive services (e.g., text captions) to the hearing-impaired user communicating with a communication device (e.g., caption phone, caption enabled device, etc.) that is specifically configured to communicate with the captioning communication service.

In particular, a captioning communication service may be a telecommunication assistive service, which is intended to permit a hearing-impaired person to utilize a communication network and assist their understanding of a conversation by providing text captions to supplement the voice conversation. The captioning communication service may include an operator, referred to as a "call assistant," who serves as a human intermediary between the hearing-impaired user and a far-end user. During a captioning communication session, the call assistant may listen to the audio signal of a far-end user and "revoice" the words of the far-end user to a speech recognition computer program tuned to the voice of the call assistant. Text captions (also referred to as "captions") may be generated by the speech recognition computer as a transcription of the audio signal of the far-end user, and then transmitted to the communication device being used by the hearing-impaired user. The communication device may then display the text captions while the hearing-impaired user carries on a normal conversation with the far-end user. The text captions may allow the hearing-impaired user to supplement the voice received from the far-end and confirm his or her understanding of the words spoken by the far-end user.

During a communication session, the communication device may experience echo (e.g., hybrid echo, acoustic echo, etc.). The term "hybrid echo" (also referred to as "electric echo") describes a phenomenon in which a fraction of the signal leaving the phone is reflected by a hybrid circuit and returns into the near-end communication device. This is particularly prevalent in voice-band communication circuits where there are impedance imbalances in local two-wire to four-wire hybrid circuits are used. The effect of hybrid echo is that the near-end user hears their own utterances repeated back to them. Echo cancellation systems are conventionally employed within communication devices to cancel hybrid echo and/or acoustic echo.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Embodiments of the disclosure include a communication device specifically configured for use by a hearing-impaired user. The communication device comprises a microphone configured to generate a near-end voice signal, communication elements configured to receive a received far-end voice signal through a network from a far-end communication device, and a processor operably coupled with the microphone and the communication elements. The processor is configured to automatically control a volume level of an audio stream signal reproduced by a third party captioning communication service responsive to determining which of the near-end voice signal and the received far-end voice signal is active.

Embodiments of the disclosure include a method of operating a captioning communication service for hearing-impaired users. The method comprises determining an active talker situation responsive to comparing a near-end voice signal from a near-end communication device and a received far-end voice signal from a far-end communication device, and automatically adjusting a volume level of an audio stream reproduced by a third party captioning communication service based on the determined active talker situation.

Additional embodiments include a captioning communication system, comprising a near-end communication device and a captioning communication service. The near-end communication device includes a microphone configured to capture a near-end voice signal during a communication session with a far-end communication device, communication elements configured to receive a far-end voice signal from the far-end communication device during the communication session, a speaker configured to reproduce the far-end voice signal, an electronic display configured to display text captions during the communication session, and a processor operably coupled with the microphone, the communication elements, the speaker, and the electronic display. The captioning communication service is configured to generate a text transcription of the far-end voice signal during the communication session and transmit the text transcription in real time to the near-end communication device for the text captions to be displayed. At least one of the near-end communication device and the captioning communication system is configured to operate a volume control system configured to automatically adjust a volume of an audio stream reproduced by a speaker of the captioning communication device responsive to a volume control command identifying which of the far-end voice signal and the near-end voice signal is active at a given time, and an echo modifier configured to add distortion to an echo portion of the far-end voice signal when generating the audio stream.

DETAILED DESCRIPTION

Figure 1:
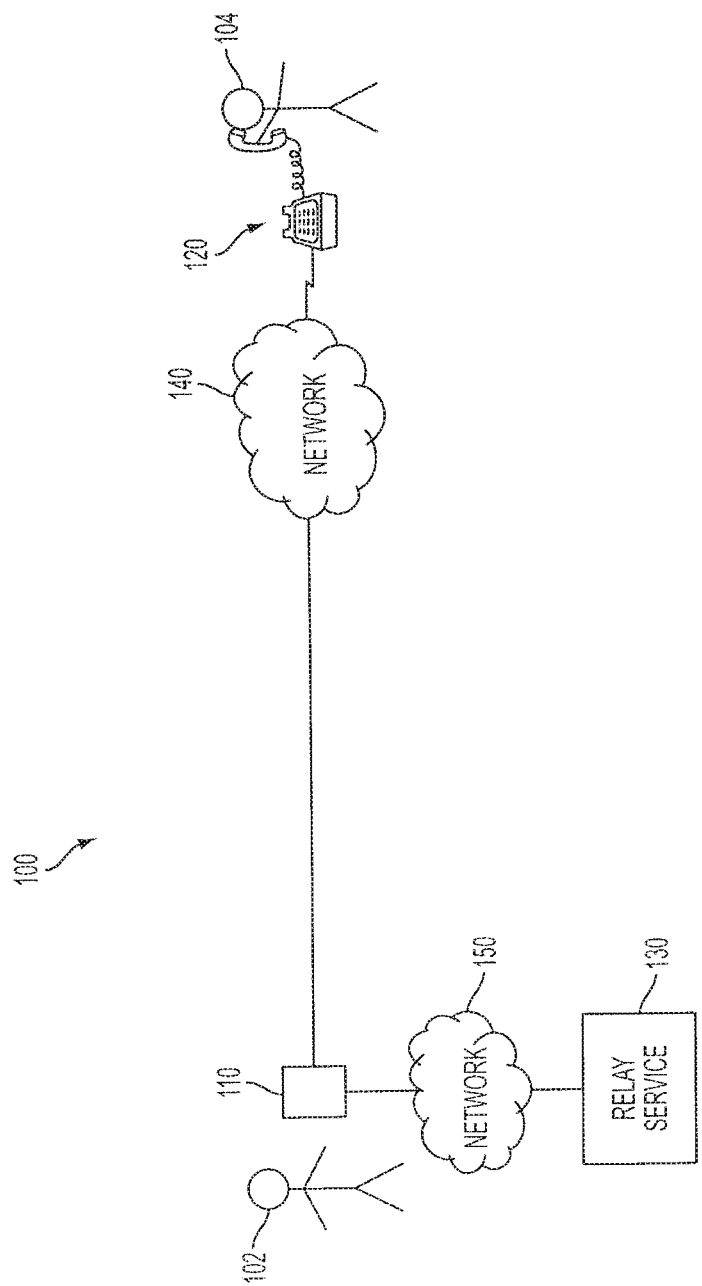
FIG. 1 illustrates a communication system configured to facilitate a call between a hearing-impaired user and a far-end user.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a captioning communication service for providing text captions to a caption-enabled communication device to assist hearing-impaired users. Embodiments include features that improve the functionality of the communication device such that new communication device and method for establishing captioning communication sessions are described. As a result, the interaction of the communication device with other systems (e.g., the captioning communication service) may be improved in addition to an improved user experience.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals there between. Generally, when discussing calls herein, they are often referred to from the perspective of the communication device associated with the audibly-impaired user. Thus, an "incoming call" may originate from a far-end user to a near-end communication device and an "outgoing call" may originate from a near-end user to a far-end communication device. Of course, it is recognized that "near-end" and "far-end" are relative terms depending on the perspective of the particular user. Thus, the terms "near-end" and "far-end" are used as a convenient way to distinguish between users and devices.

The term "captioning communication session" as used herein refers to the communication session between the hearing-impaired user's communication device and the captioning communication service. The captioning communication session may pass text captions from the captioning communication service to the hearing-impaired user's communication device. In some embodiments, the captioning communication session may also include the hearing-impaired user's communication device transmitting the far-end user's audio signal to the captioning communication service to generate the text captions.

The term "audio signal" (or voice signal) refers to the signal generated and transmitted by a communication device during a call. Most examples are provided from the perspective of a hearing-impaired user using a captioning communication device, such that the audio signal captured by that device is sometimes referred to as the "near-end audio signal," and the audio signal received to be reproduced by the speaker is sometimes referred to as the "far-end audio signal." The terms "near-end" and "far-end" may also be referred to as "local" and "remote," respectively.

FIG. 1 illustrates a communication system 100 configured to facilitate an assisted call between a hearing-impaired user 102 and a far-end user 104. The communication system 100 may include a first communication device 110, a second communication device 120, and a third party communication service 130, which may be a captioning communication service or a relay service (as illustrated in FIG. 1). The first communication device 110 and the second communication device 120 may be coupled together to facilitate communication there between via a first network 140. The first communication device 110 and the third party communication service 130 may be coupled together to facilitate communication there between via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The first communication device 110 may include a device that is configured to assist the hearing-impaired user 102 in communicating with another individual (e.g., far-end user 104). In some embodiments, the first communication device 110 may include a caption-enabled communication device configured to receive and display text captions of at least a portion of the conversation. Thus, the hearing-impaired user 102 may be able to read the text captions of the words spoken by the far-end user 104 to supplement the audio signal received by the first communication device 110. As a result, the hearing-impaired user 102 may have an improved experience in understanding the conversation. Such an embodiment may be useful for people whose hearing has been damaged or decreased over time (e.g., the elderly); such that they can still speak but have diminished hearing that makes it difficult to communicate. In some embodiments, the first communication device 110 may also be configured to receive and display video on an electronic display on the first communication device 110.

The second communication device 120 may comprise a conventional voice telephone (e.g., landline phone, cellular phone, smart phone, VoIP phone, etc.). As such, the far-end user 104 may interact in a conventional manner with the second communication device 120. In some embodiments, the second communication device 120 may be configured similarly as the first communication device (e.g., caption-enabled communication device). As a result, the second communication device 120 may likewise be operated by a hearing-impaired user. Thus, although facilitating communication between the hearing-impaired user 102 and the far-end user 104 is shown in FIG. 1 to imply that the far-end user 104 is a hearing-capable user, such a situation is shown only as an example. Other embodiments include both the first communication device 110 and the second communication device 120 coupled to the third party communication service 130 to facilitate the captioning services for each respective hearing-impaired user. In such a situation, each of the first and second communication devices 110, 120 may have its own communication session with the third party communication service 130.

The third party communication service 130 may be configured to provide interpretive services (e.g., captioning) to the hearing-impaired user 102. More specifically, a human "call assistant" within third party communication service 130 may be employed to facilitate an assisted call between a hearing-impaired user 102 and a far-end user 104. As discussed above, in some embodiments the third party communication service 130 may be configured to provide text captions of at least a portion of the conversation. In such an embodiment, the call assistant may listen to the voice signal received and re-voice the portion of the conversation into a microphone so that voice recognition software may generate the text captions that are transmitted to the first communication device 110. Thus, the third party communication service 130 may include one or more of an internet protocol captioned telephone service (IPCTS), captioned telephone service (CTS), or other telecommunications relay services (TRS).

FIG. 1 shows a configuration where the first communication device 110 acts as a router for the voice signal from the second communication device 120 to the third party communication service 130. In such an embodiment, the voice signal of the far-end user 104 may be transmitted from the second communication device 120 to the first communication device 110. The voice signal of the far-end user 104 may then be transmitted from the first communication device 110 to the third party communication service 130 for the text captions to be generated in a text captioning embodiment. The text captions may then be transmitted from the third party communication service 130 to the first communication device 110 to be displayed as text captions for the hearing-impaired user to read during the conversation. The call assistant may also monitor the text captions that are generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the third party communication service 130 may be configured to receive the far-end voice signal from the second communication device 120 and route the far-end voice signal to the first communication device 110.

In addition, although FIG. 1 shows only two communication devices 110, 120, the communication system 100 may include more communication devices. It is contemplated that the communication system 100 may facilitate communication between any number and combinations of hearing-impaired users and far-end users. For example, in some embodiments two or more communication devices may be connected for facilitating communication between a hearing-impaired user and other hearing-impaired users and/or far-end users.

Embodiments of the disclosure include devices and methods for remote attenuation of the audio stream received by the captioning communication system. For example, talker direction detection may be performed on a local system then a command may be sent with the encoded audio stream (e.g., Speex) over a communication channel to a remote captioning communication system to allow the captioning communication service to determine the best method to process the audio stream by suppressing echo or otherwise modify the signal. In addition, embodiments may combine an echo volume control with an echo modifier to reduce the effect of echo present in received audio when doubletalk is present.

Figure 2:
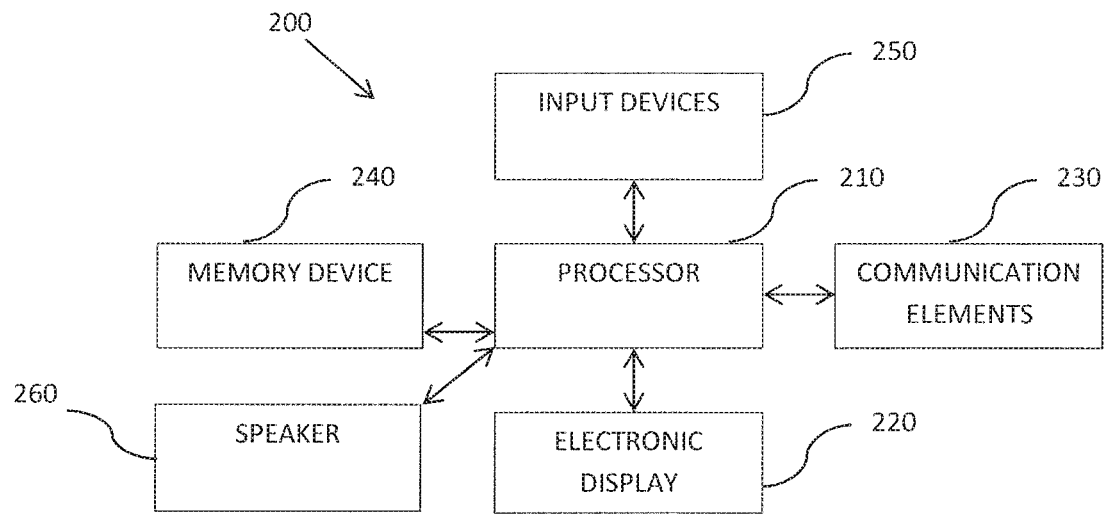
FIG. 2 is a simplified schematic block diagram of a communication device associated with a hearing-impaired user according to an embodiment of the disclosure.

FIG. 2 is a simplified schematic block diagram of a communication device 200 associated with a hearing-impaired user according to an embodiment of the disclosure. For example, the communication device 200 may be the first communication device 110 of FIG. 1. In particular, the communication device 200 may be configured to establish calls with other communication devices and captioning communication sessions with a captioning communication service configured to assist the hearing-impaired user. The communication device 200 may be a caption enabled communication device, which may be implemented as a stand-alone device (e.g., a caption phone), or as implemented on another device (e.g., tablet computer, laptop computer, smart phone, etc.).

The communication device 200 may include a processor 210 operably coupled with an electronic display 220, communication elements 230, a memory device 240, input devices 250, and a speaker 260. In some embodiments, the communication device 200 may include a camera for also participating in a video communication session. The processor 210 may coordinate the communication between the various devices as well as execute instructions stored in computer-readable media of the memory device 240. The processor 210 may be configured to execute a wide variety of operating systems and applications including the computing instructions. The memory device 240 may be used to hold computing instructions, data, and other information for performing a wide variety of tasks including performing embodiments disclosed herein. By way of example and not limitation, the memory device 240 may include Synchronous Random Access Memory (SRAM), Dynamic RAM (DRAM), Read-Only Memory (ROM), Flash memory, and the like. The memory device 240 may include volatile and non-volatile memory storage for the communication device 200.

The communication elements 230 may be configured to communicate with other devices or communication networks, including other communication devices and the captioning communication service. As non-limiting examples, the communication elements 230 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols. The input devices 250 may include a numeric keypad, a keyboard, a touchscreen, a remote control, a mouse, buttons, other input devices, or combinations thereof.

Figure 3:
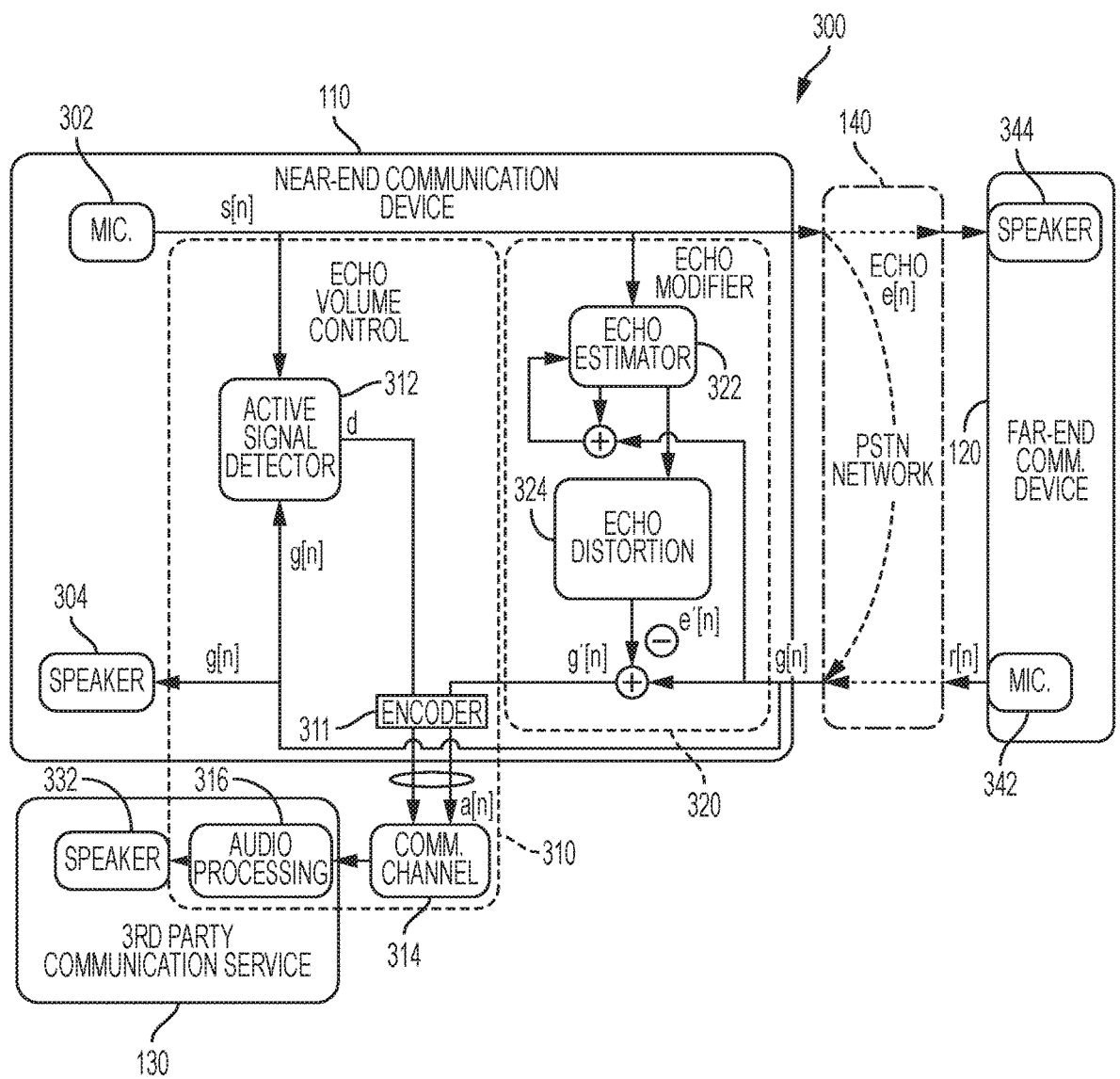
FIG. 3 is a captioning communication system including an automatic volume control system according to an embodiment of the disclosure.

FIG. 3 is a captioning communication system 300 including an automatic volume control system according to an embodiment of the disclosure. The captioning communication system 300 includes a first communication device 110 (e.g., local caption communication device) specifically configured for use by a hearing-impaired user (i.e., a local user) to communicate with the second communication device 120 associated with a far-end user (i.e., remote user) over a first network 140 (e.g., PSTN network). The captioning communication system 300 may further include a third party communication service 130 (i.e., third party communication service) that is configured to communicate with the first communication device 110 to provide text captions during a communication session to assist the hearing-impaired user. In particular, the first communication device 110 may be configured to receive the far-end voice signal, which may also be routed to the third party communication service 130 which generates the text transcription of the far-end voice signal that is provided to the first communication device 110 to display to the hearing-impaired user during the communication session.

Throughout this description, reference to various signals is made. For example, the local outgoing signal is referred to as the near-end voice signal s[n], while the remote incoming signal is referred to as the far-end voice signal r[n]. The echo from the near-end voice signal s[n] that is caused by the first network 140, e.g., a PSTN network, is referred as the echo signal e[n]. The signal that is received by the first communication device 110 is referred to as the received far-end voice signal g[n], which is the sum of the far-end voice signal r[n] and the echo e[n]. In other words, g[n]=r[n]+e[n]. When there is no echo, the received far-end voice signal and the far-end voice signal r[n] are substantially equal.

The received far-end voice signal g[n] is received by the echo modifier 320, which adds distortion (e.g., resulting in modified echo estimate signal e'[n]) to generate the modified received far-end voice signal g'[n] (also referred to as the "audio stream"). The modified echo estimate signal e'[n] is generated by an echo modifier 320 that will be discussed further below. The packetized output signal a[n] may include the packetized form (via encoder 311) of the modified received far-end voice signal g'[n] as well as an volume control command (d). These signals will be discussed further below.

The captioning communication system 300 further includes an echo volume control 310 that is configured to automatically control the volume of the audio signal (e.g., modified received far-end voice signal g'[n]) received and reproduced by the third party communication service 130 during the communication session. For example, the echo volume control 310 may set the volume of the audio signal at a first level responsive to a determination that only the far-end user is speaking. The echo volume control 310 is configured to set the volume of the audio signal received by the third party communication service 130 at a second level responsive to a determination that only the near-end user is speaking. The first level is higher (i.e., louder) than the second level. In other words, when only the near-end user is speaking, the volume level of the audio signal provided to the call assistant may be attenuated in comparison to the volume level of the audio signal provided to the call assistant when only the far-end user is speaking. In some embodiments, the second level may be completely attenuated (e.g., suppressed) such that no sound is produced for the call assistant.

The echo volume control 310 may include an active signal detector 312 that is configured to perform the determination of which talker is active at a given time. For example, the active signal detector 312 may be receive the near-end voice signal s[n] and the received far-end voice signal g[n] to determine which of the two signals s[n], g[n] are active to indicate whether the near-end user and/or the far-end user are active (i.e., talking) at a given time. Because the received far-end voice signal g[n] is a form of the far-end voice signal r[n] generated by the second communication device 120, it also follows that the active signal detector 312 determines whether the near-end voice signal s[n] or the far-end voice signal r[n] is active. Thus, the active signal detector 312 determines if the near-end user is active (i.e., talking), if the far-end user is active (i.e., talking), or if both the near-end user and the far-end use are active (i.e., a double-talk situation). Thus, it could be said that the active signal detector 312 determines the "direction" of which party is currently talking. For example, active signal detector 312 may compare (e.g., cross correlate) the near-end voice signal with the received far-end voice signal g[n].

The active signal detector 312 may be further configured to generate an volume control command (d) that indicates which user is active responsive to the determination discussed above. In some embodiments, the volume control command (d) may have different states for various situations. For example, the active signal detector 312 may be configured generate the volume control command to have a first state corresponding to the "near-end only" situation, and a second state corresponding to the "far-end only situation." In some embodiments, the active signal detector 312 may include a third state corresponding to the "double talk" situation, whereas other embodiments may simply generate the volume control command (d) corresponding to the double talk situation to be the same state as the "far-end only" situation.

The first communication device 110 may be configured to send the volume control command (d) along with the speaker out signal g'[n] to the encoder 311, which encodes the two signals into the encoded signal packet a[n] that is transmitted to the third party communication service 130 through the communication channel 314 for use by the audio processing logic 316 of the third party communication service 130 when generating the text transcription of the far-end voice signal r[n].

In some embodiments, the volume control command (d) may be a flag bit or other instruction that is interpreted by the audio processing as which talker situation should be applied to the particular audio packet received. For example, the volume control command (d) generated by the active signal detector 312 may be a binary value (e.g., 0 or 1), in which the logic of the audio processing logic 316 may interpret a first value (e.g., 0) to be a first volume level for the audio packet (e.g., no attenuation) and a second value (e.g., 1) to correspond to a second volume level for the audio packet (e.g., full attenuation) provided to the speaker 332. Of course, it is contemplated that the binary values may be reversed in the way they are interpreted by the logic of the audio processing logic 316.

In some embodiments, the volume control command (d) may be in the form of a numerical value or other instruction that corresponds to a volume level or amount of attenuation of the audio packet to be passed onto the speaker 332. For example, the volume control command (d) generated by the active signal detector 312 may be an attenuation value (e.g., integer) between a volume range (e.g., 0 and 5) supported by the audio processing logic 316, in which the logic of the audio processing logic 316 may interpret a first value (e.g., 0) to correspond to attenuation for a first volume level (e.g., no attenuation) for the audio packet and a second attenuation value (e.g., 5) to correspond to attenuation for a second volume level (e.g., full attenuation) for the audio packet provided to the speaker 332. The intermediate values may be assigned to a scale of intermediate attenuation levels, if desired. Of course, it should be recognized that different schemes are contemplated for the volume control command (d) depending on how the logic for the audio processing logic 316 is configured to provide the audio packets to the speaker 332 at different levels for the third party communication assistant to hear (or not hear) the far-end voice signal depending on the situation determined by the active signal detector 312. Regardless of the specific logic scheme, the echo volume control provides the audio packets to the speaker 332 of the third party communication service 130 at a louder volume during the far-end talker only situation in comparison to the near-end talker only situation. In some embodiments, the double talk situation may be handled the same way as the far-end talker only situation in terms of the volume of the audio packets provided to the speaker 332.

As shown in FIG. 3, at least some of the features and functionality (e.g., active signal detector 312) of the echo volume control 310 may be included within the first communication device 110. In addition, at least some of the features and functionality (e.g., audio processing logic 316) of the echo volume control 310 may be included within the third party communication service 130. As discussed above, the active signal detector 312 may be configured to determine whether the local user or remote user is speaking, and send a volume control command (d) to the audio processing logic 316. The audio processing logic 316 may be configured to reduce the volume of the audio packets to the speaker 332 responsive to the information provided by the volume control command (d).

The captioning communication system 300 further includes an echo modifier 320. The echo modifier 320 may be configured to add distortion to the echo signal such that the audio packets received by the audio processing logic 316 may have an echo signal that is distorted from its original state such that the call assistant may better audibly distinguish between the far-end voice signal portion and the modified echo portion.

The echo modifier 320 may include an echo estimator 322 and an echo distortion logic 324. The echo estimator 322 may be configured to generate an estimate of the echo e[n]. The echo estimator 322 may include adaptive filter that is configured to generate an estimated echo signal as its output. The adaptive filter may receive the near-end voice signal s[n], and be configured to train its coefficients based on the error signal generated from the difference between the received far-end voice signal g[n] and the output from the echo estimator 322. The output from the echo estimator 322 is approximately the echo e[n]; however, rather than subtracting out the echo as with conventional echo cancellation systems, the echo distortion logic 324 receive the estimate echo signal and add distortion to generate the modified echo estimate signal e'[n]. As a result, it is the modified echo signal e'[n] is summed (e.g., subtracted) with the received far-end voice signal g[n] to generate the modified received far-end voice signal g'[n]. Because the modified echo estimate signal e'[n] and the echo e[n] portion of the received far-end voice signal g[n] may be highly correlated, when the modified echo e'[n] is subtracted from the echo e[n] the remaining signal is substantially the difference caused by the modification that was performed on the estimate, plus a certain amount of error produced by inaccuracy in the echo estimator 322. Because the far-end voice signal r[n] portion of the received far-end voice signal g[n] and the modified echo estimate e'[n] may not be well correlated, subtracting the modified echo estimate signal e'[n] may have little effect on that portion. As a result, the resulting modified received far-end voice signal g'[n] includes the far-end voice signal r[n] and a distorted version of the echo (e.g., e'[n]-e[n]). As a result, when the modified received far-end voice signal g'[n] is reproduced by the speaker 332 of the third party communication service 130, the distorted version of the echo may be audibly distinguishable from the far-end voice signal r[n] by the third party communications assistant when they listen to the far-end voice signal to generate the text transcription for the text captions. Thus, the third party call assistant may have an improved experience in revoicing the correct voice signal, which may improve the accuracy of the text captions. Echo distortion may include any process that makes the echo portion audibly distinguishable from the far-end voice portion of the received far-end voice signal g[n]. Non-limiting examples of echo modification may include frequency shifting, signal modulation, partial or complete attenuation, adding white or colored noise, etc.

As discussed above, the echo volume control 310 includes an active signal detector 312 that determines whether the local user or remote user is talking. In some embodiments, the active signal detector 312 may include a double talk detector. The result of the active signal detector 312 may be generated in the form of the volume control command (d) that is packaged with the audio stream g'[n] to form a[n], which is received by the third party communication service 130 over a communication channel 314 (e.g., the Internet or other digital network, radio frequency communications network, optical communications network, serial or parallel bus, etc.). The third party communication service 130 (e.g., through audio processing logic 316) processes the audio stream g'[n] based, at least in part, on the results of the direction detector (e.g., according to the volume control command (d)) as discussed above. If the signal is from the local user the audio can be attenuated, or other processing can be performed as needed (e.g., filtering, amplification, etc.). If the signal is from the remote user the audio is passed unmodified, or other processing can be performed as needed (e.g., filtering, amplification, attenuation, etc.). After processing, the resulting signal is reproduced for the call assistant to hear and perform their duties of generating the text transcription of the far-end voice. Thus, in situations when doubletalk is present, the echo modifier 320 alters the echo portion e[n] of the received far-end voice signal g[n], such that the communications assistant at the third party communication service 130 can audibly distinguish between the near-end voice and far-end voice signals.

Figure 4:
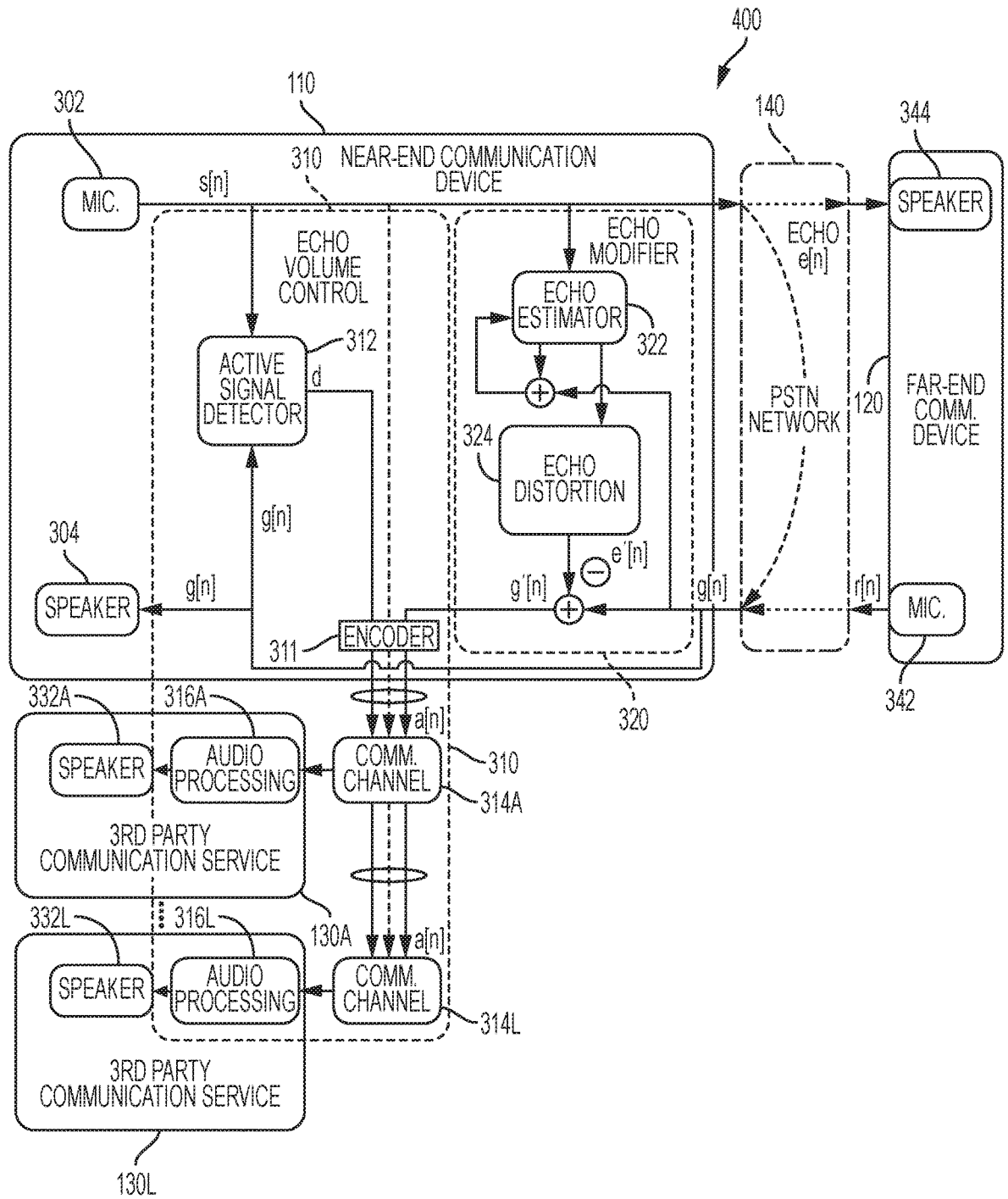
FIG. 4 is a captioning communication system including an automatic volume control system according to another embodiment of the disclosure.

FIG. 4 is a captioning communication system 400 including an automatic volume control system according to another embodiment of the disclosure. The captioning communication system 400 includes similar elements as in FIG. 3, but with additional third party communication services 130A, 130B. Each third party communication service 130A, 130L may include audio processing logic 316A, 316L, and a speaker 332A, 332L for its call assistant.

As discussed above with respect to FIG. 3, the first communication device 110 may transmit the combined command (d) and the modified received far-end voice signal g'[n] (i.e., encoded signal packet a[n]) to any number of third party recipients over communication channels 314A, 314L. In some embodiments, the communication channels 314A, 314L may be the same or distinct communications channels for each third party communication service 130A, 130L. Each third party communication service 130A, 130L may refer to different call assistants within the same location (e.g., call center) or different call assistants located within different locations, as desired. Each audio processing logic 316A, 316L may process the encoded signal packet a[n] according to its specific needs. For example, the first audio processing logic 316A associated with a first call assistant may be configured to process the encoded signal packet a[n] differently than the third party audio processing logic 316B associated with a second call assistant.

In some embodiments, the near-end voice signal s[n] may also be transmitted to one or more of the third party communication services 130A, 130L through the communication channels 314A, 314L. In such an embodiment, it may be desirable for one call assistant to transcribe the near-end voice signal s[n], while another call assistant transcribe the far-end voice signal r[n] from the modified received far-end voice signal g'[n]. For example, the first call assistant may transcribe the near-end voice signal s[n] (in which case the modified received far-end voice signal g'[n] may be attenuated by audio processing logic 316A), and the second call assistant may transcribe the far-end voice signal r[n] from the modified received far-end voice signal g'[n] (in which case the near-end voice signal s[n] may be attenuated by the audio processing logic 316L).

Figure 5:
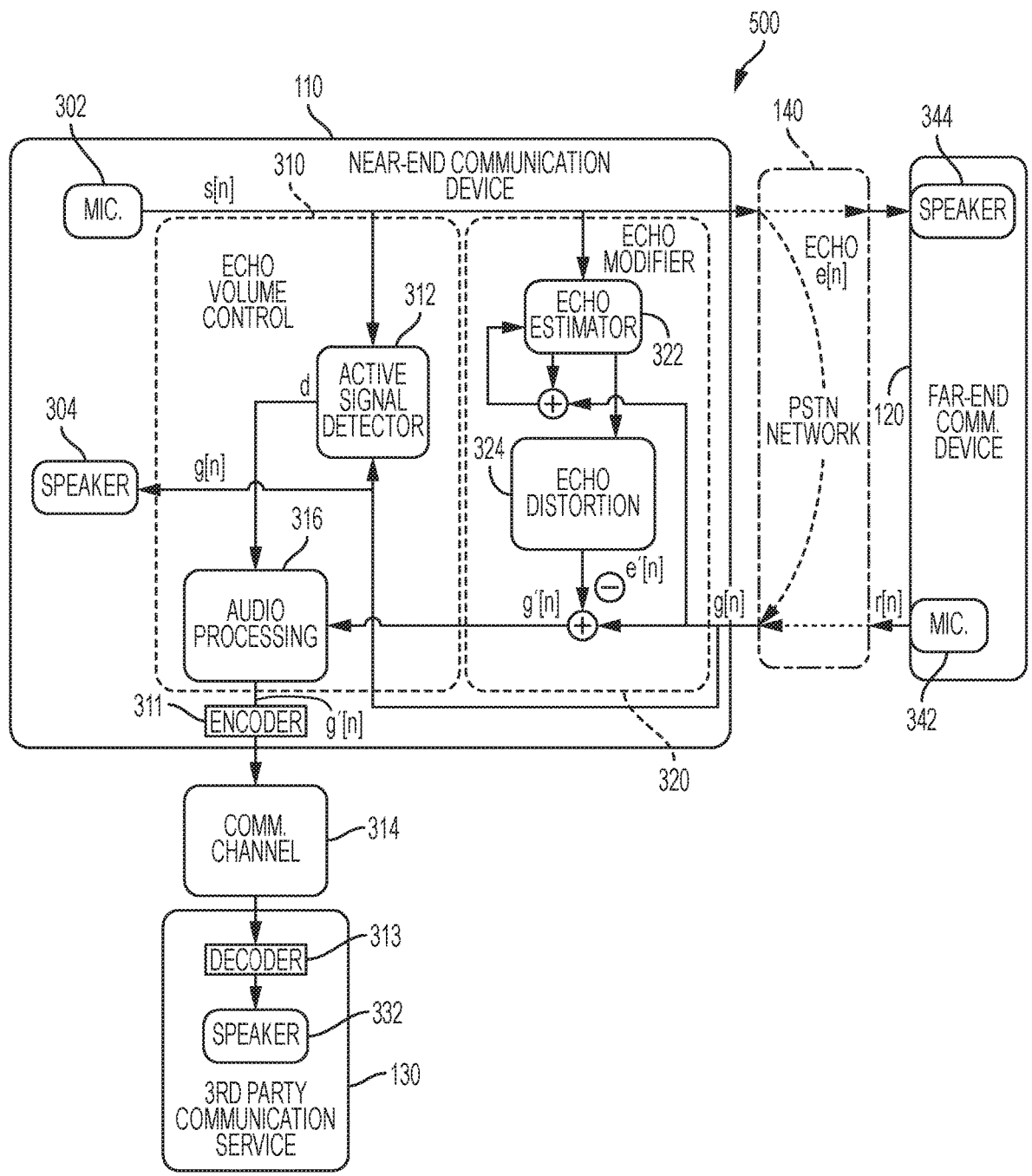
FIG. 5 is a captioning communication system including an automatic volume control system according to another embodiment of the disclosure.

FIG. 5 is a captioning communication system 500 including an automatic volume control system according to another embodiment of the disclosure. The captioning communication system 400 includes similar elements as in FIG. 3, but with the audio processing logic 316 being performed locally by the first communication device 110. For example, the volume control command (d) from the active signal detector 312 may be used locally to process the modified received far-end voice signal g'[n]. Thus, the processed audio stream g'[n] may be transmitted to the third party communication service 130 through the communication channel 314 having a volume with the first level or second level based on the volume control command (d). In some embodiments, rather than sending an attenuated encoded version of the modified received far-end voice signal g'[n], the audio processing logic 316 may be configured to not send any modified received far-end voice signal g'[n] in the near-end only situation determined by the active signal detector 312. The audio processing logic 316 may send the modified received far-end voice signal g'[n] to the third party communication service 130 through the communication channel 314 in the far-end only situation and/or the double talk situation determined by the active signal detector 312. The third party communication service 130 may receive the encoded version of the modified received far-end voice signal g'[n] and decode it to be reproduced by the speaker 332 for the call assistant to generate the text transcription of the far-end voice signal r[n] portion of the modified received far-end voice signal g'[n] as discussed above.

Figure 6:
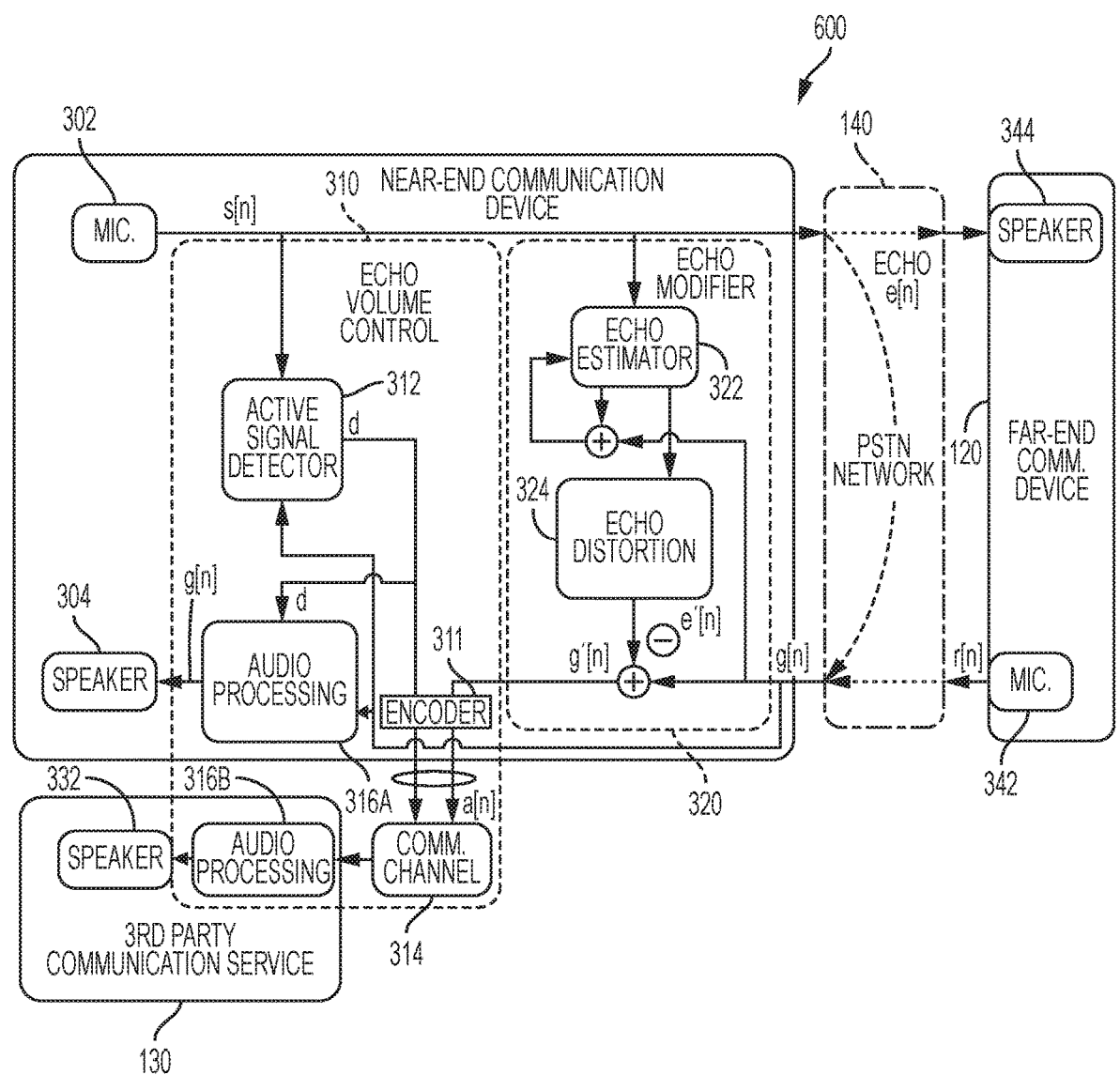
FIG. 6 is a captioning communication system including an automatic volume control system according to another embodiment of the disclosure.

FIG. 6 is a captioning communication system 600 including an automatic volume control system according to another embodiment of the disclosure. The captioning communication system 600 includes similar elements as in FIG. 3, but with the audio processing logic 316A being performed locally by the first communication device 110 as well with third party audio processing logic 316B being performed remotely by the third party communication service 130. Thus, the active signal detector 312 may provide the volume control command (d) to the local audio processing logic 316A, and the third party audio processing logic 316B (via encoder 311) such that each may provide the appropriate audio processing of received version of the modified received far-end voice signal g'[n] according to its specific requirements based on the volume control command (d). The third party communication service 130 may also include a decoder (not shown in FIG. 6) that is configured to decode the signal received through the communication channel 314 for processing.

Figure 7:
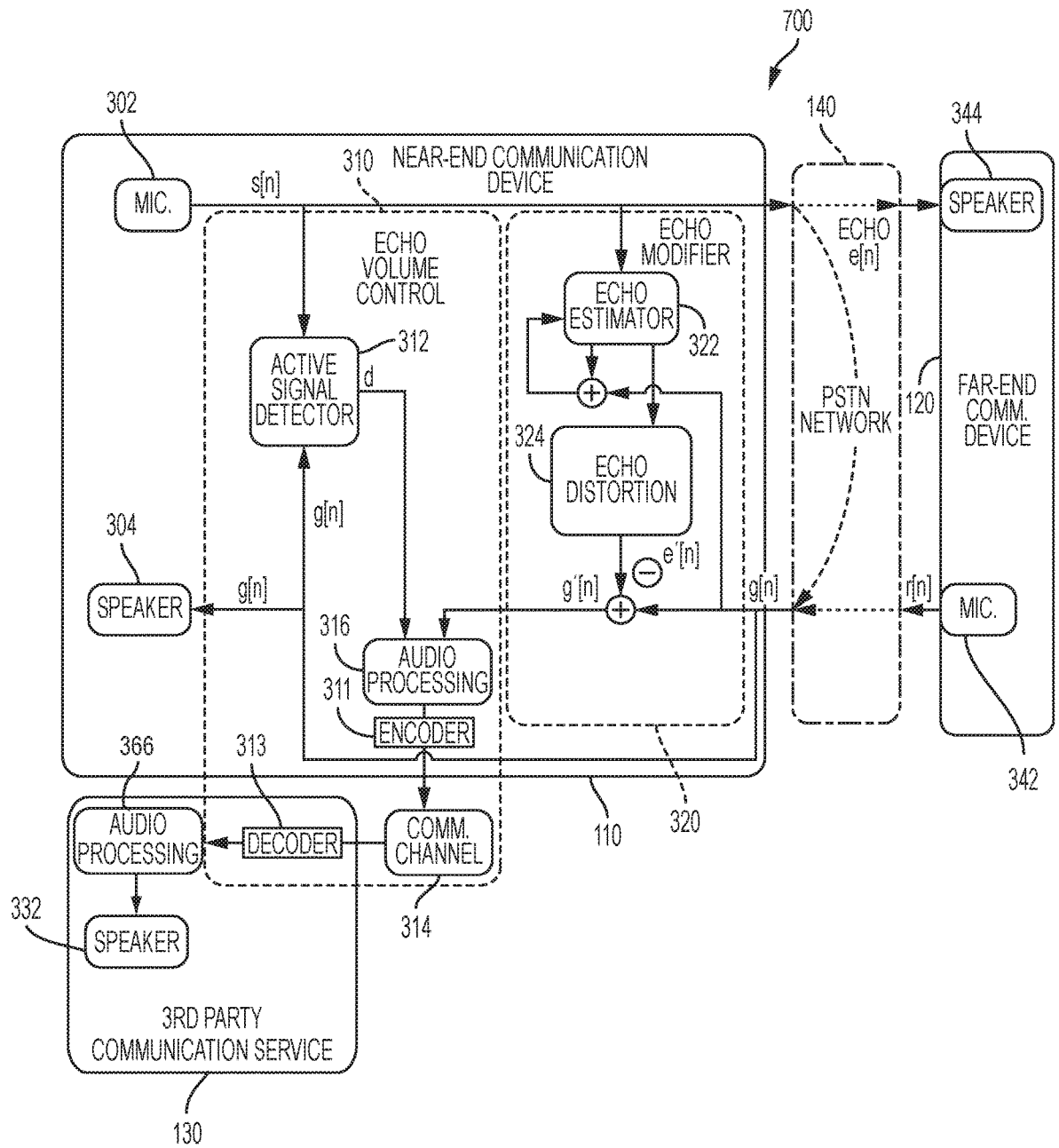
FIG. 7 is a captioning communication system including an automatic volume control system according to another embodiment of the disclosure.

FIG. 7 is a captioning communication system 700 including an automatic volume control system according to another embodiment of the disclosure. The captioning communication system 700 includes similar elements as in FIG. 5 with the audio processing logic 316 of the echo volume control 310 being performed locally in the first communication device 110, but with the processed modified received far-end voice signal g'[n] (via the audio processing logic 316) only being forwarded to the third party communication service 130. In some embodiments, additional audio processing 366 may be performed remotely by the third party communication service 130 prior to being sent to the speaker 332.

Figure 8:
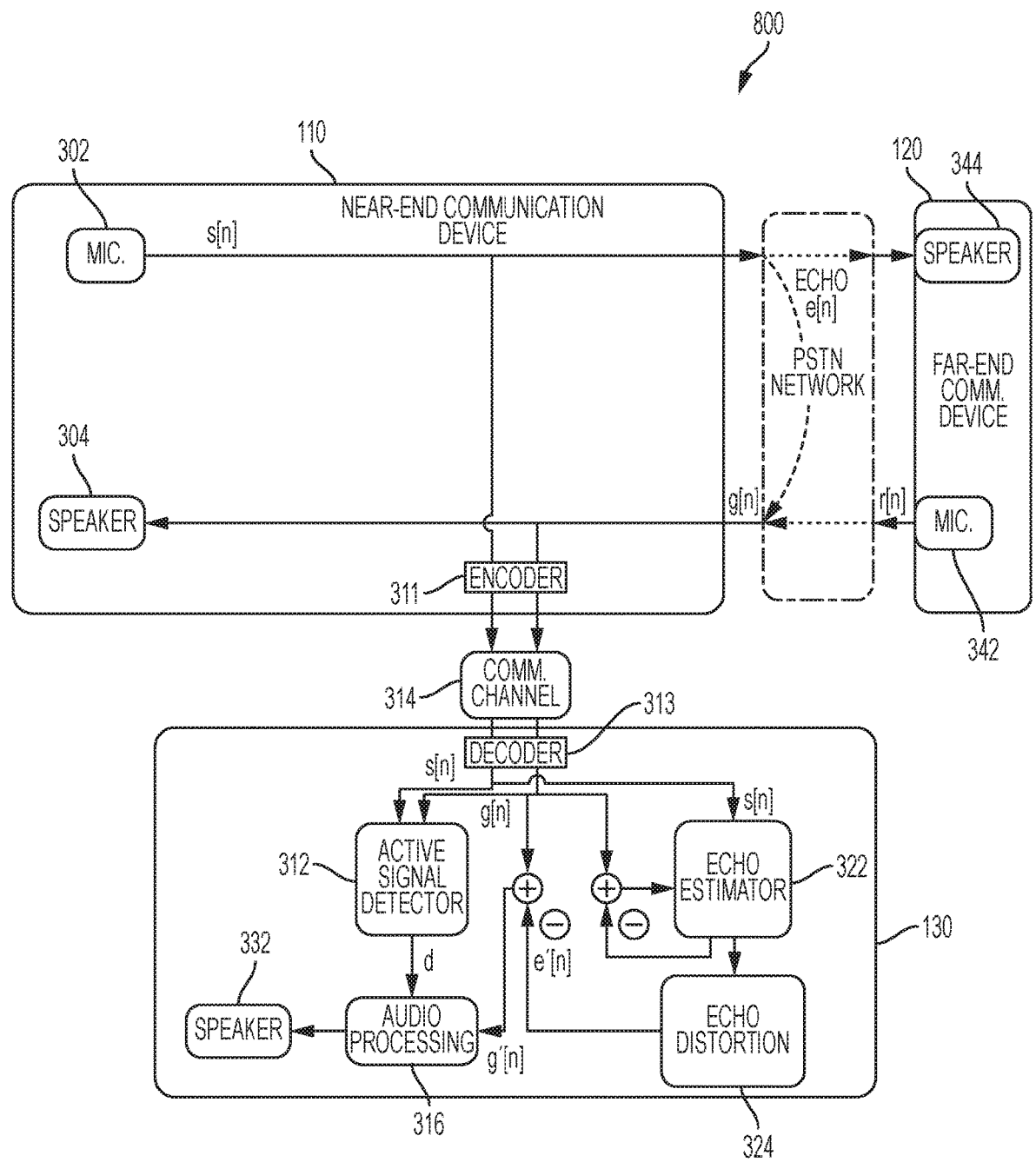
FIG. 8 is a captioning communication system including an automatic volume control system according to another embodiment of the disclosure.

FIG. 8 is a captioning communication system 800 including an automatic volume control system according to another embodiment of the disclosure. The captioning communication system 800 includes similar elements as in FIG. 3, but with the elements of the echo volume control 310 and the echo modifier 320 being performed by the third party communication service 130. Thus, the first communication device 110 may be configured to transmit the near-end voice signal s[n] and the received far-end voice signal g[n] to the third party communication service 130 through the communication channel 314. The third party communication service 130 may include the active signal detector 312, the audio processing logic 316, the echo estimator 322, and the echo distortion logic 324 that are configured as discussed above. Thus, the third party communication service 130 may perform the different active talker situations and related attenuation scenarios, as well as the echo estimation and echo modification. It is therefore contemplated that the features and methodology described herein may be performed locally the first communication device 110, by the third party communication service 130, or any combination thereof.

In FIGS. 3 through 8, the speaker 304 of the first communication device 110 may receive the received far-end voice signal g[n] or an echo canceled version thereof. Thus, in some embodiments, the received far-end voice signal g[n] may by processed through a conventional echo canceler locally even if the signal received by the second communication device 120 did not have an echo cancellation process performed thereon (see, e.g., echo canceller 305 in FIG. 3). As a result, the speaker 304 of the first communication device 110 may receive substantially the far-end voice signal r[n] with the echo removed locally. In other embodiments, the speaker 304 of the first communication device 110 may receive modified received far-end voice signal g'[n] that has been processed responsive to the volume control command d.

Figure 9:
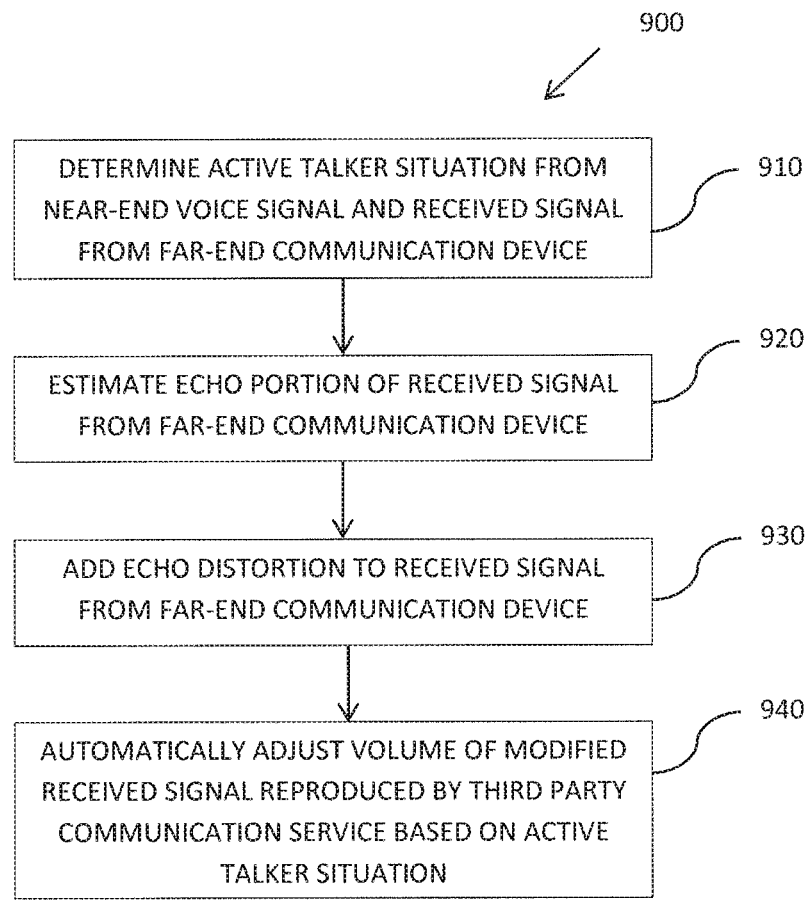
FIG. 9 is a flowchart illustrating a method for operating a captioning communication system for a hearing-impaired user according to an embodiment of the disclosure.

FIG. 9 is a flowchart 900 illustrating a method for operating a captioning communication system for a hearing-impaired user according to an embodiment of the disclosure. At operation 910, the active talker situation may be determined from the near-end voice signal and the received signal from the far-end communication device. The active talker situation may be determined to be a far-end only situation, a near-end only situation, or a double talk situation by comparing (e.g., cross correlating) the received signal and the near-end voice signal.

At operation 920, the echo portion of the received signal from the far-end communication device may be estimated through an adaptive filter that receives the near-end voice signal, and trains the filter based on the error signal generated from the difference between the received signal and the output from the echo estimator. In contrast with conventional systems, however, the estimated echo is not subtracted from the received signal to generate an echo cancelled signal. Rather, at operation 930, echo distortion is added to the received signal. The echo distortion may include distorting the estimate echo signal and subtractive the result from the received signal. The distortion may include frequency shifting, signal modulation, partial or complete attenuation, adding white or colored noise, or combinations thereof, to the estimated echo signal, which is then summed (e.g., subtracted) with the received signal to generate a modified received far-end voice signal that is used as the audio stream for the third party communication service.

At operation 940, the volume of the modified received far-end voice signal reproduced by the third party communication service may be automatically adjusted based on the determined active talker situation. For example, the volume for the far-end only situation may have a first level (e.g., high volume) and the volume for the near-end only situation may have a second level (e.g., low volume). In some embodiments, the second level for the near-end only situation may be complete attenuation of the modified received far-end voice signal such that the call assistant's speaker does not produce sound for generating a text transcription of the far-end voice signal portion of the modified audio signal. Different operations of FIG. 9 may be performed by the near-end communication device, the third party communication service, or a combination thereof.

Figure 10:
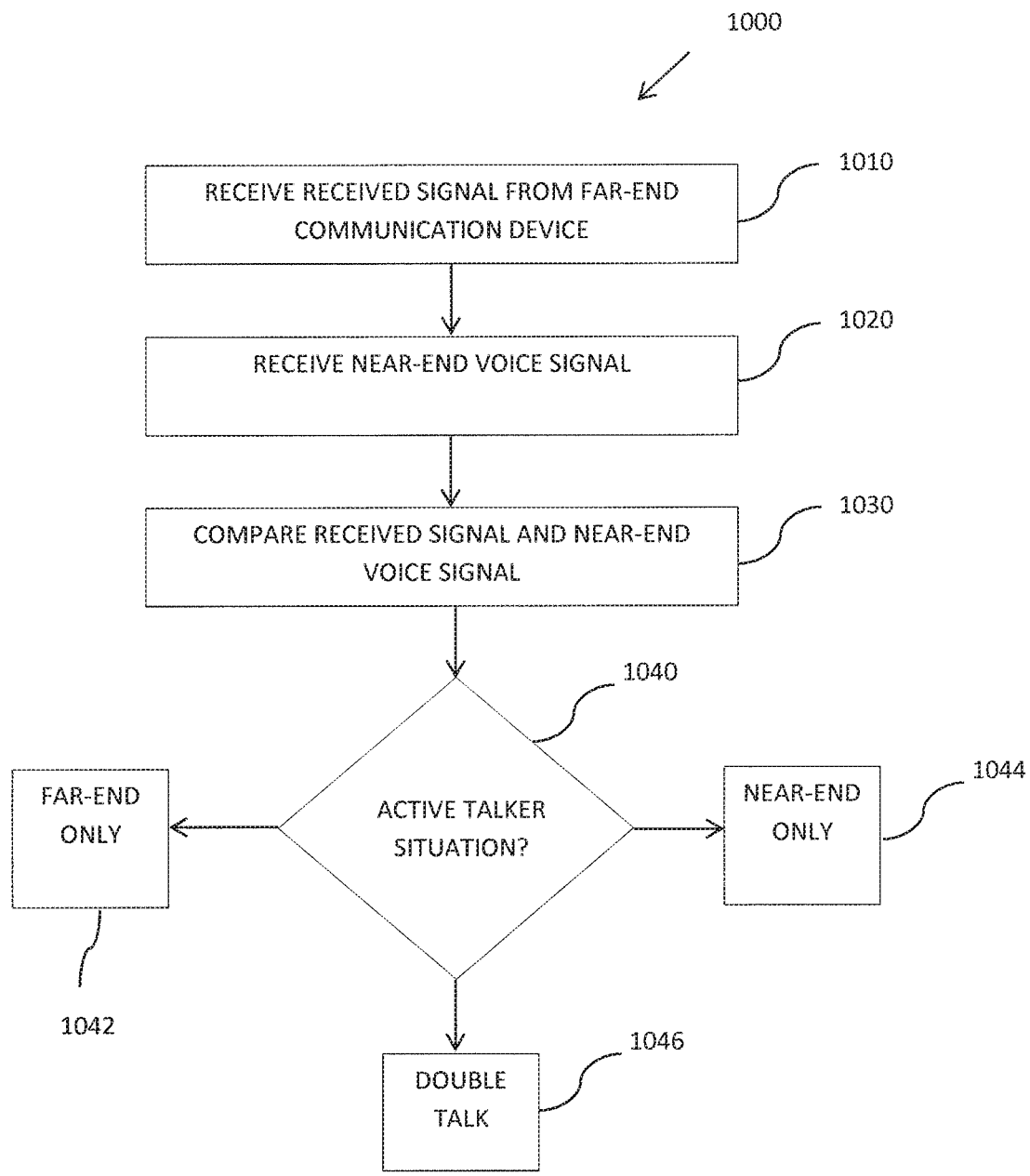
FIG. 10 is a flowchart illustrating a method for determining an active talker situation for a captioning communication system for a hearing-impaired user according to an embodiment of the disclosure.

FIG. 10 is a flowchart 1000 illustrating a method for determining an active talker situation for a captioning communication system for a hearing-impaired user according to an embodiment of the disclosure. At operation 1010, the received signal may be received from the far-end communication device. At operation 1020, the near-end voice signal may be received from the microphone of the near-end communication device. At operation 1030, the received signal and the near-end voice signal may be compared (e.g., cross correlation) to determine which signal is active at a given time or if both signals are active. At operation 1040, the result of the comparison may determine which situation is occurring. The situations may include the far-end only situation 1042, the near-end only situation 1044, and the double talk situation 1046. During each of these situations (e.g., states), the active signal detector may generate an volume control command (d) that is used by the audio processing of the audio stream to determine the automatic volume control to the speaker of the third party communication service. The volume control command (d) may include a binary flag, a numerical value, or other command that indicates to the audio processing the active talker situation, such that the audio processing can then take the appropriate actions (e.g., pass the audio, attenuate the audio, etc.). Different operations of FIG. 10 may be performed by the near-end communication device, the third party communication service, or a combination thereof.

Figure 11:
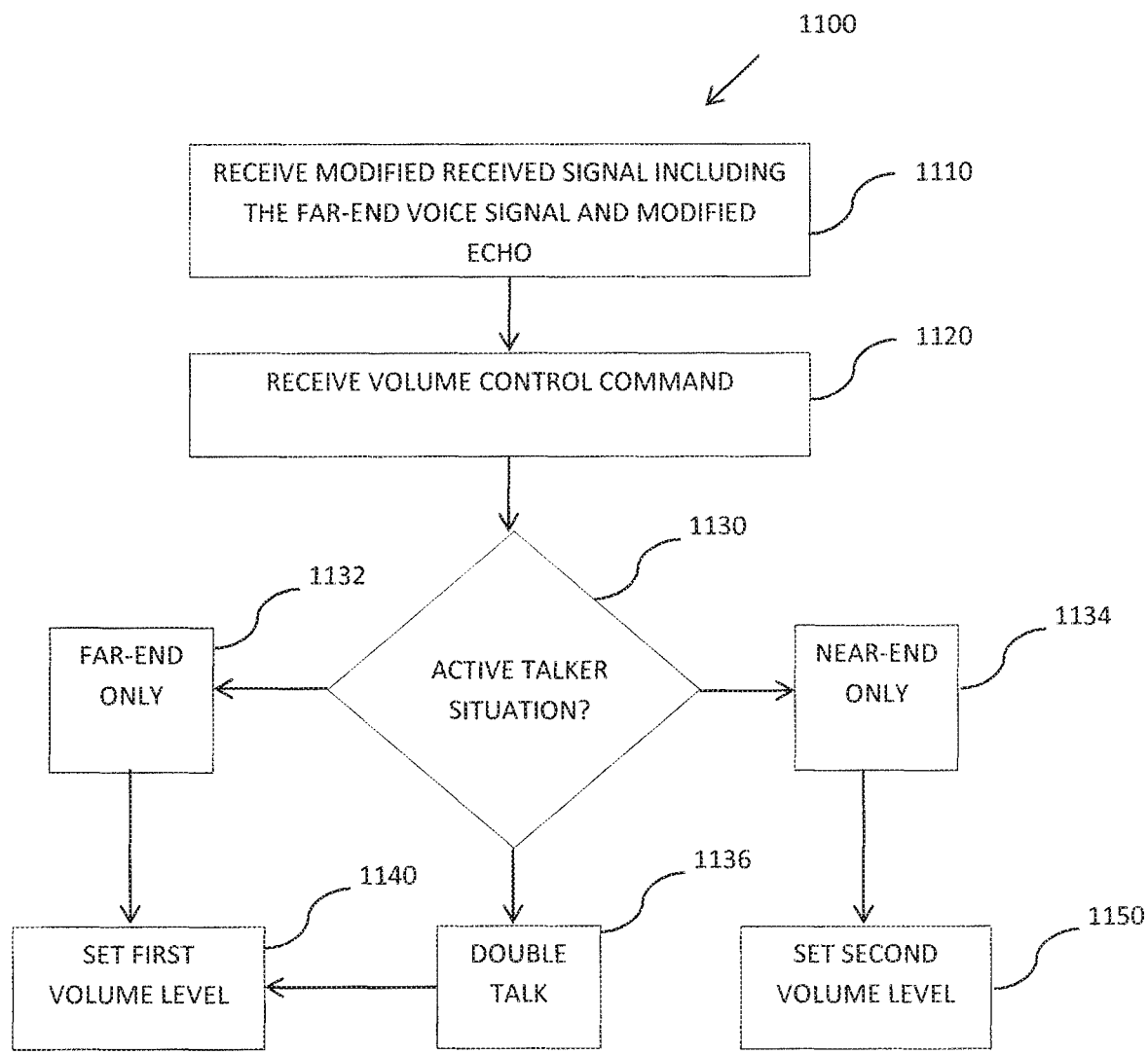
FIG. 11 is a flowchart illustrating a method for processing audio for a captioning communication service of a captioning communication system for a hearing-impaired user according to an embodiment of the disclosure.

FIG. 11 is a flowchart 1100 illustrating a method for processing audio for a captioning communication service of a captioning communication system for a hearing-impaired user according to an embodiment of the disclosure. At operation 1110, the modified received far-end voice signal including the far-end voice signal and modified echo may be received. At operation 1120, the volume control command may be received. At operation 1130, the active talker situation may be determined from the volume control command received. As discussed above, the situations may include the far-end only situation 1132, the near-end only situation 1134, and the double talk situation 1136. If the situation is the far-end only situation, the volume level for the produced audio for the call assistant may be set at a first level (e.g., higher) at operation 1140. If the situation is the near-end only situation, the volume level for the produced audio for the call assistant may be set at a second level (e.g., lower) at operation 1150. In some embodiments, if the situation is a double talk situation, the volume level for the produced audio for the call assistant may be set at the first level (i.e., the same as the far-end only situation). In some embodiments, if the situation is a double talk situation, the volume level for the produced audio for the call assistant may be set at a third level (i.e., different than the far-end only situation). Different operations of FIG. 11 may be performed by the near-end communication device, the third party communication service, or a combination thereof.

Embodiments of the disclosure, therefore, may be used to reduce negative effects of the presence of echo when traditional methods (e.g., echo cancellation) cannot be used or may not be preferred. In addition, the performance of standard echo suppression may be improved in the presence of doubletalk. As a result, remote third party devices (e.g., call assistant devices for a captioning communication service) receiving the audio stream may determine how audio is to be processed before reproducing the audio to the third party end user (e.g., call assistant). In addition, call assistants and other third party listeners may be provided with the ability to discern between local voice and remote voice signals as a result of the modified received far-end voice signal g'[n] being used, which includes a distorted version of the echo that may assist the call assistant to audibly distinguish between the far-end voice signal and the echo that results from the near-end voice signal. This may make it easier for the call assistant to transcribe the correct talker's words in comparison to conventional systems that do not perform echo cancellation on the audio stream sent to the call assistant, or for which echo cancellation does not adequately eliminate all echo.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication device comprising:
   a microphone configured to capture first sound and generate a near-end voice signal based on the first sound;
   communication elements configured to receive a signal that includes a far-end voice signal obtained over a network and to direct an audio stream signal to a captioning communication system remote from the communication device, the audio stream signal based on the received signal; and
   a computing system communicatively coupled to the microphone and the communication elements and configured to cause the communication device to perform operations, the operations comprising:
   determine an activity of the received signal;
   determine an activity of the near-end voice signal; and
   automatically control a volume level of audio, which is based on the audio stream signal, produced by the captioning communication system based on the activity of the received signal and the activity of the near-end voice signal, the automatically controlling the volume level of the audio including reducing the volume level of the audio in response to the received signal being inactive and the near-end voice signal being active.

2. The communication device of claim 1, wherein automatically controlling the volume level of the audio comprises generate a volume control command based on the activity of the near-end voice signal and the activity of the received signal, the communication device further comprising audio processing logic configured to obtain the volume control command and to adjust the volume level of the audio based on the volume control command to automatically control the volume level of the audio.

3. The communication device of claim 1, wherein automatically controlling the volume level of the audio comprises:
generate a volume control command based on the activity of the near-end voice signal and the received signal; and
encode the audio stream signal with the volume control command in packets that are communicated to the captioning communication system to automatically control the volume level of the audio, the captioning communication system including audio processing logic configured to obtain the volume control command and to adjust the volume level of the audio based on the volume control command at the captioning communication system.

4. The communication device of claim 3, wherein the volume control command is one of a binary flag or a numerical value.

5. The communication device of claim 1, wherein the operations further comprise:
generate an estimated echo signal of an echo signal that is included in the received signal;
add distortion to the estimated echo signal to generate a modified estimated echo signal; and
generate the audio stream signal based on a summation of the modified estimated echo signal and the received signal.

6. The communication device of claim 5, wherein adding distortion to the estimated echo signal includes performing at least one of the following with respect to the estimated echo signal: frequency shifting, signal modulation, attenuation, adding white noise, and adding colored noise.

7. The communication device of claim 1, wherein the automatically controlling the volume level of the audio further includes setting the volume level to a first level in response to determining that received signal is active.

8. The communication device of claim 7, wherein the automatically controlling the volume level of the audio further includes setting the volume level to a third level in response to both the near-end voice signal and the received signal being simultaneously active, the third level being different than the first level.

9. A method comprising:
determining an active talker situation responsive to comparing a near-end voice signal generated by a near-end communication device and a received signal based on a far-end voice signal derived from a far-end communication device;
generating, at the near-end communication device, an audio stream signal based on the received signal;
directing the audio stream signal to a captioning communication system remote from the near-end communication device; and
automatically controlling a volume level of audio, which is based on the audio stream signal, produced by the captioning communication system based on the determined active talker situation, the automatically controlling the volume level of the audio including reducing the volume level of the audio in response to the determined active talker situation indicating that the received signal is inactive and the near-end voice signal is active.

10. The method of claim 9, wherein comparing the near-end voice signal and the received signal includes cross-correlating the received signal and the near-end voice signal.

11. The method of claim 9, wherein the active talker situation is selected from the group consisting of: a near-end situation in which only the near-end voice signal is active, a far-end situation in which only the received signal is active, and a double talk situation in which both the near-end voice signal and the received signal are active.

12. The method of claim 9, wherein automatically controlling the volume level of the audio comprises:
generating a volume control command indicating the determined active talker situation; and directing adjustment of the volume level of the audio based on the volume control command.

13. The method of claim 9, wherein automatically controlling the volume level of the audio comprises:
generating a volume control command indicating the determined active talker situation; and
processing the audio stream signal according to the volume control command, prior to the audio being produced by the captioning communication system, to have a first volume level for a first active talker situation and a second volume level for a second active talker situation.

14. The method of claim 13, wherein generating the volume control command is performed by the near-end communication device, and processing the audio stream signal is performed by the captioning communication system.

15. The method of claim 13, wherein generating the volume control command and processing the audio stream signal are both performed by the captioning communication system.

16. The method of claim 13, wherein generating the volume control command and processing the audio stream signal are both performed by the near-end communication device.

17. The method of claim 9, further comprising:
estimating an echo portion of the received signal; and
adding distortion to the estimated echo portion to generate a modified estimated echo signal,
wherein the audio stream signal is generated based on the modified estimated echo signal and the received signal such that the audio stream signal is a modified version of the received signal that includes the echo portion.

18. The method of claim 9, wherein automatically controlling the volume level of the audio comprises:
packetizing the audio stream signal with a volume control command determined based on the determined active talker situation; and
sending the packets to the captioning communication system in which the captioning communication system adjusts the volume level of the audio produced by the audio stream signal based on the volume control command.

19. A system comprising:
one or more non-transitory computer-readable media having instructions stored thereon; and
one or more processors communicatively coupled to the one or more computer-readable media and configured to, in response to executing the instructions, cause the system to perform operations, the operations comprising:

obtain, from a communication device remote from the system, an audio stream signal that is generated from a received signal that is received at the communication device over a network and that is based on a far-end voice signal generated by a far-end communication device; and produce audio based on the audio stream signal in which a volume level of the produced audio is based on activity of the received signal at the communication device and based on activity of a near-end signal generated by the communication device based on sound captured by a microphone of the communication device, wherein the volume level of the produced audio is reduced in response to the received signal being inactive and the near-end signal being active.

20. The system of claim 19, wherein the audio stream signal is based on a modified estimated echo signal that includes distortion added to an estimated echo signal of an echo signal included in the received signal.

* * * * *